(12) United States Patent
Hyodo

(10) Patent No.: US 8,305,484 B2
(45) Date of Patent: Nov. 6, 2012

(54) MANUAL FOCUS ADJUSTMENT APPARATUS AND FOCUS ASSISTING PROGRAM

(75) Inventor: Manabu Hyodo, Saitama (JP)

(73) Assignee: Fujifilm Corporation, Tokyo (JP)

( * ) Notice: Subject to any disclaimer, the term of this patent is extended or adjusted under 35 U.S.C. 154(b) by 84 days.

(21) Appl. No.: 12/947,654

(22) Filed: Nov. 16, 2010

(65) Prior Publication Data

US 2011/0058094 A1   Mar. 10, 2011

Related U.S. Application Data

(62) Division of application No. 11/091,546, filed on Mar. 29, 2005, now Pat. No. 7,932,949.

(30) Foreign Application Priority Data

Mar. 30, 2004   (JP) .................................. 2004-100853

(51) Int. Cl.
  *H04N 5/232*  (2006.01)
  *G03B 13/00*  (2006.01)
  *G03B 3/10*  (2006.01)
  *G03B 13/24*  (2006.01)

(52) U.S. Cl. ........ 348/345; 348/348; 396/103; 396/104; 396/121; 396/150; 396/151

(58) Field of Classification Search .......... 348/345–354; 396/103, 104, 121, 150, 151
  See application file for complete search history.

(56) References Cited

U.S. PATENT DOCUMENTS

| 5,623,309 | A | 4/1997 | Yoshimura et al. | |
|---|---|---|---|---|
| 6,731,868 | B2 | 5/2004 | Yoshida et al. | |
| 7,003,223 | B2 * | 2/2006 | Sasaki et al. | 396/103 |
| 7,365,789 | B2 * | 4/2008 | Ogino | 348/345 |
| 7,773,146 | B2 * | 8/2010 | Suda | 348/354 |
| 2002/0149689 | A1 * | 10/2002 | Sannoh et al. | 348/333.02 |
| 2003/0117517 | A1 * | 6/2003 | Ogino | 348/356 |
| 2003/0174233 | A1 | 9/2003 | Onozawa | |
| 2004/0080662 | A1 * | 4/2004 | Ogino | 348/345 |
| 2004/0165879 | A1 * | 8/2004 | Sasaki et al. | 396/137 |
| 2005/0191047 | A1 | 9/2005 | Toji | |

FOREIGN PATENT DOCUMENTS

| JP | 8-265631 A | 10/1996 |
|---|---|---|
| JP | 9-322046 A | 12/1997 |
| JP | 2001-57645 A | 2/2001 |
| JP | 2002-244019 A | 8/2002 |
| JP | 2002-281375 A | 9/2002 |
| JP | 2003-262910 A | 9/2003 |
| JP | 2004-48526 A | 2/2004 |
| JP | 2004-72297 A | 3/2004 |
| JP | 2004-85672 A | 3/2004 |

* cited by examiner

*Primary Examiner* — John Villecco
*Assistant Examiner* — Selam Gebriel
(74) *Attorney, Agent, or Firm* — Birch, Stewart, Kolasch & Birch, LLP

(57) ABSTRACT

According to the present invention, when a lens is moved in an operation of an operation device, the focal information calculated for each travel position of the lens can be graphed corresponding to the lens position, and the focal information about the current lens position can be identified from the focal information about another position. Thus, a manual focus adjustment can be made while checking the graph. Especially, since the history of the focal information calculated for each lens travel position can be graphed, the lens can travel to the lens position in which a desired peak can be obtained when there are a plurality of peaks of focal information on the graph.

9 Claims, 15 Drawing Sheets

FIG.7

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |
| 32 | 33 | 34 | 35 | 36 | 37 | 38 | 39 |
| 40 | 41 | 42 | 43 | 44 | 45 | 46 | 47 |
| 48 | 49 | 50 | 51 | 52 | 53 | 54 | 55 |
| 56 | 57 | 58 | 59 | 60 | 61 | 62 | 63 |

MANUAL FOCUS ADJUSTMENT APPARATUS AND FOCUS ASSISTING PROGRAM

CROSS REFERENCE TO RELATED APPLICATIONS

This application is a divisional of application Ser. No. 11/091,546, filed on Mar. 29, 2005 now U.S. Pat. No. 7,932,949, and this application claims priority of application no. JP-2004-100853 filed in Japan on Mar. 30, 2004, and for which priority is claimed under 35 U.S.C. §119; the entire contents of which are herein incorporated by reference.

BACKGROUND OF THE INVENTION

1. Field of the Invention

The present invention relates to a manual focus adjustment apparatus and a focus assisting program, and more specifically to a technology of assisting a digital camera in obtaining focus when a manual focus adjustment is made.

2. Description of the Related Art

Conventionally, an image input device capable of manually making a focus adjustment without checking an image is proposed (Japanese Patent Application Laid-open No. 9-322046).

The image input device obtains a focal status value (focal information) indicating the activeness of the screen according to the image signal output from the image pickup device such as a CCD, etc. when a focus lens is manually moved by a focus ring, displays a bar graph of the focal information about the lens position of the current focus lens, and displays the maximum value of the past focal information.

Thus, when a focus lens is manually moved by a focus ring, the focal status of a subject in the lens position of the current focus lens is displayed by the increment/decrement on the bar graph. By manually adjusting the focus ring such that the bar graph can indicate the maximum value, a focus adjustment can be manually made without checking an image.

SUMMARY OF THE INVENTION

The image input device described in the Japanese Patent Application Laid-open No. 9-322046 can perform a focus adjustment such that the bar graph can indicate the maximum value (focal information can indicate the maximum value) by moving a focus lens and operating the focus ring while checking the bar graph. However, there is the problem that, when there are a plurality of peaks for the focal information about a subject, the focus lens cannot be moved to a position other than the largest peak position.

For example, when an image of a person is to be taken and there is a high-contrast subject (branches and leaves of plants, etc.) in the background of the person, the focal information about the background is larger than the information about the person, and the image input device described in the Japanese Patent Application Laid-open No. 9-322046 moves the focus lens such that a focus adjustment can be made in the background.

The image input device described in the Japanese Patent Application Laid-open No. 9-322046 has the problem that a focus adjustment cannot be made with the target narrowed to a desired portion in the portions of a face such as eyes, nose, mouse, hair, etc. when the face is to be taken.

The present invention has been developed to solve the above-mentioned problems, and aims at providing a manual focus adjustment apparatus and a focus assisting program capable of obtaining focus about a desired principal subject when a manual focus adjustment is made although there are a plurality of peaks in the focal information about a subject.

To attain the above-mentioned advantage, the manual focus adjustment apparatus according to the first aspect of the present invention comprises: an operation device which moves a lens for forming an image of a subject on an image pickup device in a manual operation; a focal information calculating device which calculates focal information depending on contrast of the subject from an image signal output from the image pickup device each time the lens travels in an operation by the operation device; a focal information display device for graphing focal information about each lens position from a starting point to a current point of a manual focus adjustment corresponding to the lens position according to focal information about each lens position calculated by the focal information calculating device, the focal information display device which displays the focal information about the current point and the focal information about another point as possibly identified on the graph.

That is, when the operation device operates to move a lens, the focal information is calculated for each travel position of the lens, and the focal information calculated for each lens position is graphed corresponding to a lens position. On the graph, the focal information about the current lens position can be identified from the focal information about another position. Thus, the history of the focal information calculated for each travel position of a lens is graphed. Therefore, when there are a plurality of peaks about the focal information on the graph, the lens can be moved to a lens position in which a desired peak can be obtained.

The second aspect of the present invention is based on the manual focus adjustment apparatus according to the first aspect. The apparatus further comprises: an image display device which displays an image according to an image signal output from the image pickup device; and a designation device which designates a focus adjustment area in which a focus is obtained in an entire image displayed on the image display device. In the above-mentioned configuration, the focal information calculating device calculates the focal information depending on the contrast of the subject according to an image signal in a focus adjustment area designated by the designation device.

The designation device can designate the position and size of a focus adjustment area, and the focal information can be calculated according to the image signal in the designated focus adjustment area. Thus, for example, eyes can come into focus by designating the eyes as a focus adjustment area.

The third aspect of the present invention is based on the first or second aspect of the manual focus adjustment apparatus, and further comprises a brightness detection device which detects brightness of a subject. In the above-mentioned configuration, the focal information calculating device comprises a plurality of high pass filters having different passbands for extracting a contrast component of the subject from an image signal output from the image pickup device, and a filter selection device which selects a high pass filter for passing a low-frequency component when the brightness of the subject detected by the brightness detection device is low, calculates the focal information by adding up contrast components which pass through a high pass filter selected by the filter selection device.

When the passband of the high pass filter is enhanced, the peak of the focal information becomes acute. However, when a subject is dark, the focal information becomes extremely small. Therefore, when the brightness of a subject is low, a high pass filter which passes a component having a lower frequency than a normal component is selected so that the focal information cannot be extremely small, thereby realizing an easier focus adjustment.

The fourth aspect of the present invention is based on the manual focus adjustment apparatus according to any of the first to third aspects of the present invention, and further comprises: a brightness detection device which detects brightness of a subject. In the above-mentioned configuration, the focal information calculating device comprises a pixel mixing device for mixing image signals of a plurality of pixels adjacent to an image signal output from the image pickup device, calculates the focal information using the image signals mixed by the pixel mixing device when brightness of the subject detected by the brightness detection device is low.

The fifth aspect of the present invention is based on the manual focus adjustment apparatus according to any of the first to fourth aspects, and further comprises: a brightness detection device which detects brightness of a subject; and a sensitivity switch device which switches sensitivity of an image signal output from the image pickup device. In the above-mentioned configuration, the focal information calculating device switches sensitivity of the sensitivity switch device to high sensitivity when the brightness of the subject detected by the brightness detection device is low, and calculates the focal information using the image signal switched into the high sensitivity.

According to the fourth and fifth aspect of the present invention, as well as the invention according to the third aspect, the focal information can be prevented from being extremely small when the brightness of a subject is low, thereby realizing an easier focus adjustment.

The sixth aspect of the present invention is based on the manual focus adjustment apparatus according to any of the first to fifth aspects, and further comprises: a search device which automatically moves the lens in a predetermined lens travel range before starting a manual focus adjustment. In the above-mentioned configuration, the focal information calculating device calculates focal information depending on the contrast of the subject according to the image signal output from the image pickup device each time the lens travels by a predetermined amount by the search device; and the focal information display device graphs focal information about each lens position in the lens travel range, depending on the lens position, according to focal information about each lens position calculated by the focal information calculating device, and displays the focal information about the current point and the focal information about another point as possibly identified on the graph.

That is, by automatically moving a lens in a predetermined lens travel range (lens travel range from the vicinity to the infinity) before starting the manual focus adjustment, the relationship between each lens position and focal information can be graphed. Thus, a user who takes an image can operate an operation member while checking the graph displayed in advance when a manual focus adjustment is performed.

The seventh aspect of the present invention is based on the manual focus adjustment apparatus according to the sixth aspect, and further comprises an autofocus adjustment device which obtains a maximum value of each piece of focal information calculated by the focal information calculating device when the search device moves a lens, moves the lens to a lens position in which the maximum value is obtained, and set the lens in a standby state.

Thus, since the lens can travel to the position (focal position) in which the subject substantially comes into focus before the manual focus adjustment, there can be a small amount of adjustment about the operation member when the manual focus adjustment is performed. When there are a plurality of maximum values, the lens travels to the lens position in which the maximum value in the vicinity can be obtained because the principal subject such as a person, etc. is normally positioned in the foreground.

The eighth aspect of the present invention is based on the manual focus adjustment apparatus according to the first to seventh aspects, and further comprises: a search device which automatically moves the lens in a predetermined lens travel range before starting a manual focus adjustment; and an normalization device which obtains a maximum value of each piece of focal information calculated by the focal information calculating device when the search device moves a lens, and normalizes each piece of focal information calculated by the focal information calculating device based on the maximum value and the focal information display device graphs the focal information normalized by the normalization device.

Thus, regardless of a shooting scene, the maximum value of the focal information can be displayed as the same size on the graph, thereby improving the operability.

The ninth aspect of the present invention is a focus assisting program for a computer, connected with an imaging device having an operation device which travels a lens for forming an image of a subject on an image pickup device by manual operation, to which an image signal output from the imaging device is input, comprising the functions of: inputting information about a position of a lens in an operation of the operation device with an image signal from the imaging pickup device; calculating focal information depending on contrast of a subject according to the inputting image signal each time the lens travels; and graphing focal information about each lens position from a starting point to a current point of a manual focus adjustment according to the calculated focal information about each lens position on a monitor of the computer corresponding to a lens position. In the configuration, graphing is performed so that the focal information at the current point can be identified from the focal information at another point on the graph.

With the above-mentioned configuration of the present invention, when a lens is moved in an operation of an operation device, the focal information calculated for each travel position of the lens can be graphed corresponding to the lens position, and the focal information about the current lens position can be identified from the focal information about another position. Thus, a manual focus adjustment can be made while checking the graph. Especially, since the history of the focal information calculated for each lens travel position can be graphed, the lens can travel to the lens position in which a desired peak can be obtained when there are a plurality of peaks of focal information on the graph.

BRIEF DESCRIPTION OF THE DRAWINGS

FIG. 7 shows a divided area of the entire screen for explanation of a focus adjustment area;

DETAILED DESCRIPTION OF THE PREFERRED EMBODIMENTS

The preferred embodiments of the manual focus adjustment apparatus according to the present invention are described below in detail by referring to the attached drawings.

Figure 1:
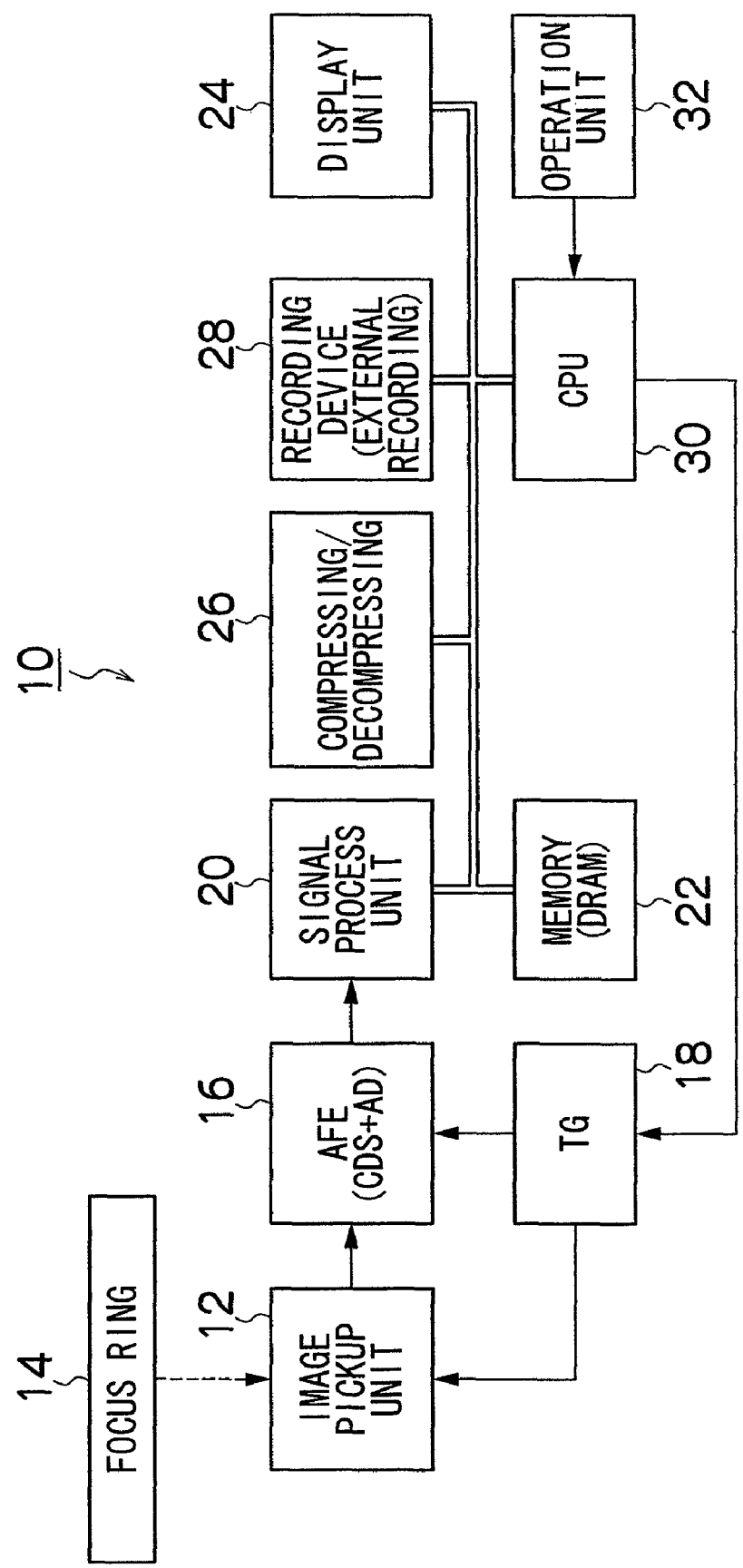
FIG. 1 is a block diagram according to an embodiment of the digital camera having the manual focus adjustment apparatus according to the present invention.

FIG. 1 is a block diagram according to an embodiment of a digital camera 10 provided with the manual focus adjustment apparatus according to the present invention.

In FIG. 1, an image pickup unit 12 includes image pickup devices such as a taking lens, an diaphragm, a CCD, etc., and a subject image formed on a photoreceptor of an image pickup device through a taking lens and a diaphragm is converted by each sensor into signal charge depending on the amount of incident light. Thus, added up signal charge can be sequentially read as a voltage signal depending on signal charge. An image pickup device can sweep the added up signal charge using a shutter gate pulse, thereby controlling the add-up time (shutter speed) of electric charge. That is, the device has what is called an electronic shutter facility.

A focus ring 14 is rotated by a user who takes an image when a manual focus (MF) adjustment is performed. Depending on the rotation position of the focus ring 14, the focus lens in the image pickup unit 12 can be arbitrarily moved from the vicinity to the infinity, that is, to an arbitrary position in a lens travel range. A device which moves a focus lens when an MF adjustment is performed is not limited to what moves a focus lens by mechanically transmitting rotating force of the focus ring 14 to the focus lens, but what electrically controls the speed of the focus lens by electrically detecting the amount of rotation of the focus ring 14 and the rotation direction, or what electrically controls the position of the focus lens by detecting the rotation position of the focus ring 14 can be used.

A voltage signal sequentially read from the image pickup unit 12 is added to an analog front end (AFE) 16. The AFE 16 has a correlation duplex sampling circuit (CDS circuit), an amplifier, an A/D converter, etc., and the CDS circuit performs a correlation duplex sampling process on the voltage signal input based on the CDS pulse supplied by the timing signal generation circuit 18. A signal processed by the CDS circuit is first gain-controlled by the amplifier, and then added to the A/D converter. The A/D converter converts an input signal to digital R, G, and B signals for each pixel based on the AD pulse supplied from a timing signal generation circuit 18, and outputs a conversion result. The image pickup device of the image pickup unit 12 and the AFE 16 are synchronously driven according to a timing signal supplied from the timing signal generation circuit 18.

The R, G, and B signals output from the AFE 16 are temporarily stored in memory 22 such as DRAM, etc. through a signal process unit 20, and then the R, G, and B signals stored in the memory 22 are treated by signal processing such as white balance adjustment, gamma correction, and YC processing in the signal process unit 20. The YC-processed brightness signal Y and a chroma signal Cr, Cb (YC signals) are output to a display unit 24 such as a liquid crystal monitor, etc. Thus, a through image, a still image, etc. can be displayed on the display unit 24.

The YC signal after the shooting is compressed in a predetermined format by a compressing/decompressing unit 26, and then recorded on a recording medium such as a memory card, etc in a memory apparatus 28. In a regeneration mode, the image data recorded on a memory card, etc. is decompressed by the compressing/decompressing unit 26, output to the display unit 24, and a regenerated image is displayed on the display unit 24.

A central processing unit (CPU) 30 centrally controls each circuit based on the input from an operation unit 32 (shutter button, mode dial, cross key, etc.), and an autofocus (AF) adjustment, automatic exposure (AE) adjustment, automatic white balance (AWB) correction, and focus assistance of the MF adjustment according to the present invention, etc.

The AF control is the contrast AF which moves the focus lens such that the high-frequency component of the R, G, and B signals can be the maximum, and moves the focus lens to the focus position such that the high-frequency component of the R, G, and B signals can be the maximum when the shutter button is half pressed.

The AE control fetches the R, G, and B signals, obtains the subject brightness (shooting EV value) based on an add-up value obtained by adding up the R, G, and B signals. Based on the shooting EV value, a diaphragm value and a shutter speed at the shooting time are determined. When the shutter button is fully pressed, the diaphragm is driven such that the determined diaphragm value can be obtained, and the add-up time of the electric charge is controlled by an electronic shutter to obtain a determined shutter speed. Then, a frame of image data is fetched, and after performing predetermined signal processing, the data is recorded on the recording medium.

Described below is the focus assisting method for the MF adjustment according to the present invention.

Figure 2:
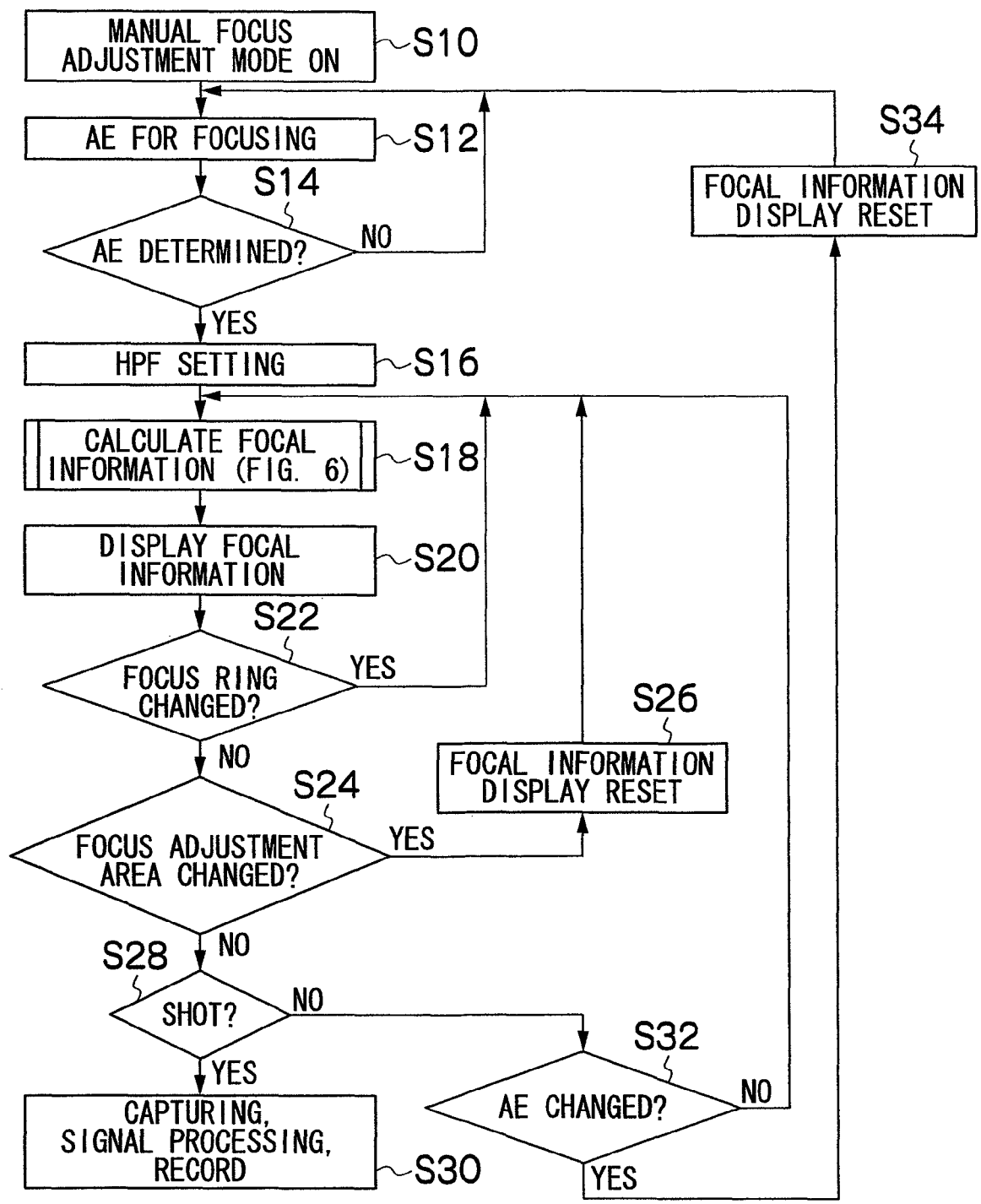
FIG. 2 is an entire flowchart including the contents of the process when an MF adjustment is performed according to the present invention.

FIG. 2 is the entire flowchart including the process contents of the MF adjustment according to the present invention.

First, the focus mode switch (not shown in the attached drawings) in the operation unit 32 is switched from AF to MF. Then, the MF adjustment mode is turned ON (step S10), and the following processes are performed.

The AE adjustment for focusing is performed (step S12). When the focusing AE is determined (step S14), a high pass filter (HPF) for extraction of a contrast component of a subject is automatically set (step S16).

Figure 3:
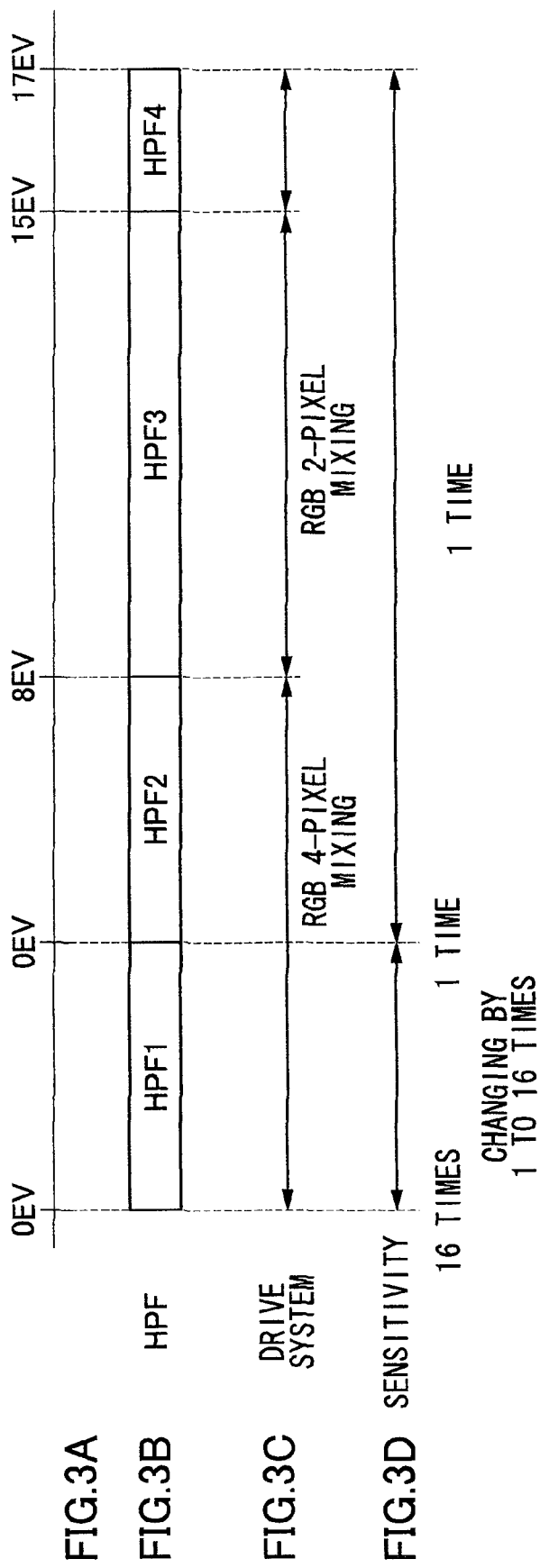
FIGS. 3A to 3D show the relationship among the brightness of a subject, the available HPF, pixel mixing, and sensitivity.

FIGS. 3A and 3B show the brightness of each subject and the relationship with the available HPF. That is, depending on the brightness of a subject, any of HPF1 through HPF4 is set.

As the brightness of subject becomes low, the HPF for passing the low-frequency component is set.

Figure 4:
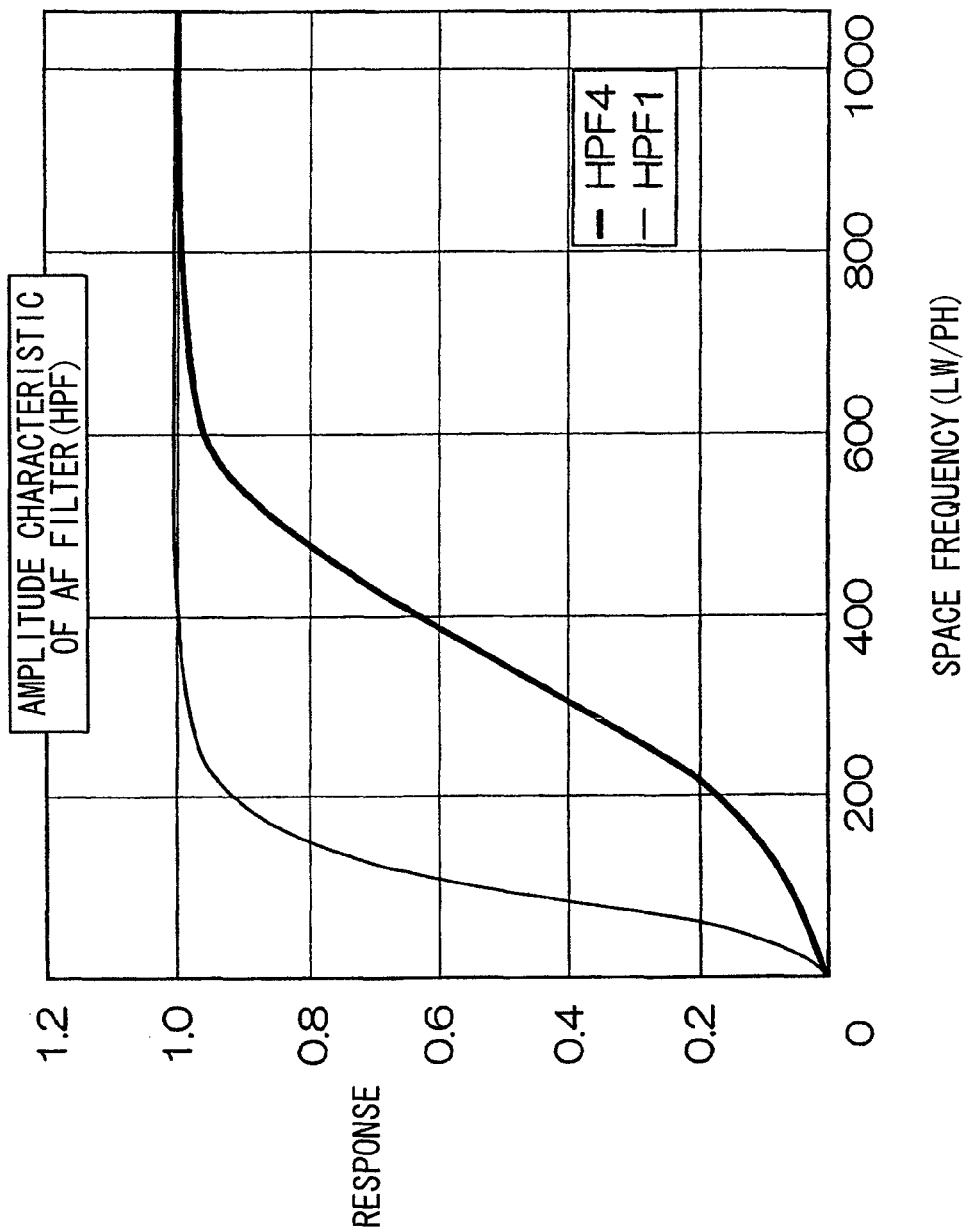
FIG. 4 is a graph of amplitude characteristic of an HPF1 and an HPF4.

FIG. 4 shows the characteristic of the HPF1 set when the brightness of a subject image is 0 EV~4 EV and the characteristic of the HPF4 to be set at 15 EV~17 EV. The HPF1 passes a low-frequency component lower than the HPF4.

Thus, when the brightness of the subject is low, the high pass filter passing the low-frequency component is set because when the brightness of the subject is low, the high-frequency component is reduced, and the value of the focal information calculated by adding up the high-frequency components becomes smaller.

As shown in FIG. 3C, pixel mixing of the R, G, and B signals is performed depending on the brightness of the subject. That is, the lower the brightness of the subject, the larger the number of pixels to be mixed, and the larger the obtained signal level.

Figure 5A:
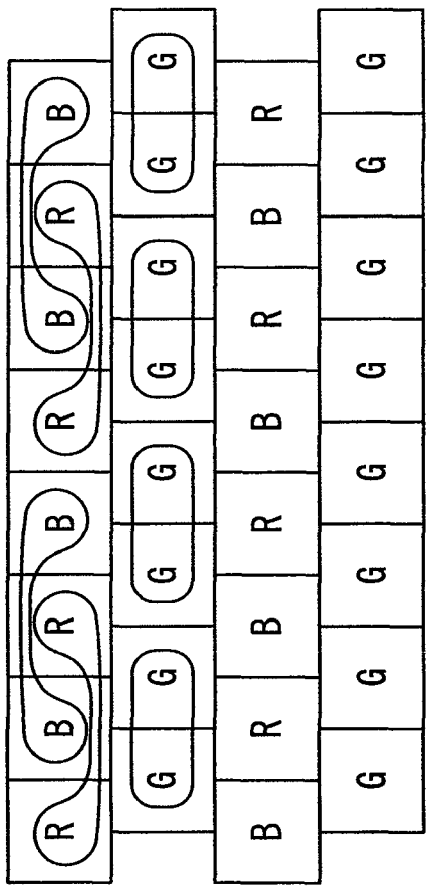
FIGS. 5A and 5B are explanatory views of 2-pixel mixing of RGB and 4-pixel mixing of RGB.
Figure 5B:
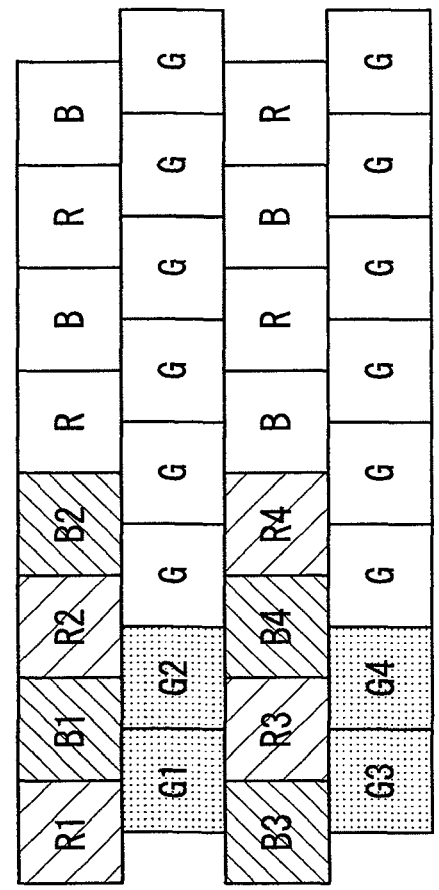

FIGS. 5A and 5B show the combination of pixels to be combined for the 2-pixel mixing and 4-pixel mixing for each of the colors RGB.

That is, by increasing the number of pixels to be combined, the low brightness of a subject can output a desired signal level.

As shown in FIG. 5B, the R, G, and B signals when 4-pixel mixing of RGB is performed, the following equations hold.

$$R=R1+R2+R3+R4$$

$$G=G1+G2+G2+G4$$

$$B=B1+B2+B3+B4 \quad \text{[Formula 1]}$$

As shown in FIG. 3C, when the brightness of a subject is high (15 EV~17 EV), pixel mixing is not performed, but only a G signal is used.

In the embodiment shown in FIGS. 3A to 3D and FIGS. 5A to 5B, the 2-pixel mixing of RGB and the 4-pixel mixing of the RGB are explained, but the present invention is not limited to this application, but 1 pixel of G, 2-pixel mixing of G, 4-pixel mixing of G can be used.

As shown in FIG. 3D, the brightness of a subject is a predetermined brightness (4 EV) or less, the lower the brightness of a subject, the higher the gain of the amplifier in the AFE 16, thus controlling the gain. For example, when the brightness of a subject is 4 EV, the diaphragm is open, and the shutter speed is the longest. Therefore, when a subject is lower than 4 EV, the level of the image signal output from the image pickup unit 12 becomes lower. To suppress the reduction of the image signal, the gain for amplifying the image signal is enhanced (improving the sensitivity), thereby obtaining a predetermined level of an image signal.

The control of setting the HPF, mixing pixels, and switching the sensitivity as shown in FIGS. 3B, 3C, and 3D can be independently performed, or appropriately combined.

Back in FIG. 2, after setting the above-mentioned HPF, the focal information is calculated (step S18).

Figure 6:
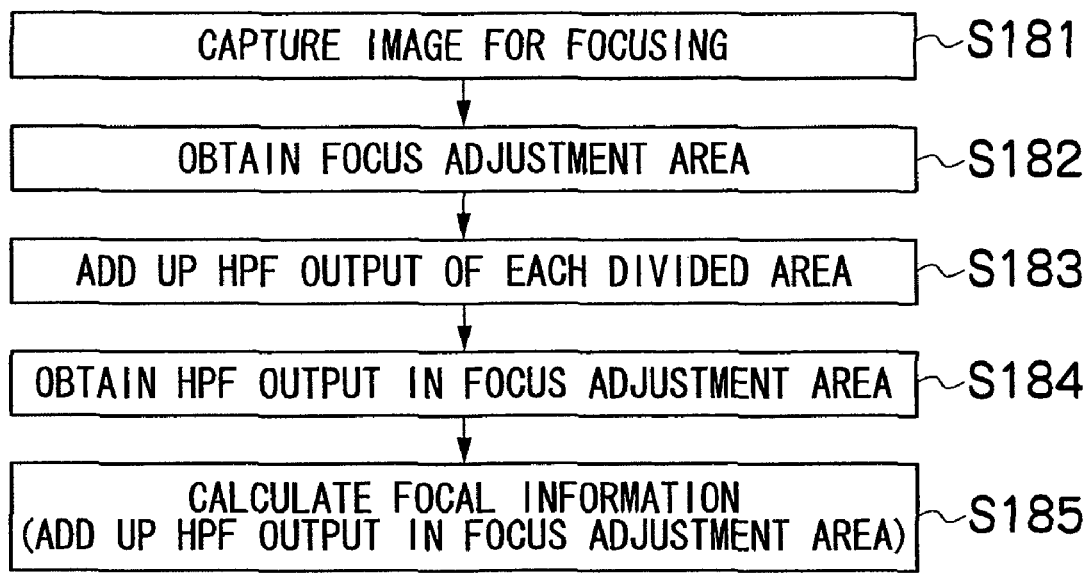
FIG. 6 is a flowchart for explanation of calculation of focal information.

The focal information is calculated as shown in FIG. 6. First, the image pickup unit 12 captures an image for focus (step S181), and an image signal of a focus adjustment area in the image signals of one screen is obtained (step S182).

The focus adjustment area is explained below. As shown in FIG. 7, one screen is divided into 64 (=8×8), and a focus adjustment area is set as a set of one or more divided areas. In the example shown in FIG. 7, the divided areas 26 to 29 are set as a focus adjustment area.

The focus adjustment area can also be set in an arbitrary position and a size on one screen.

Figure 8A:
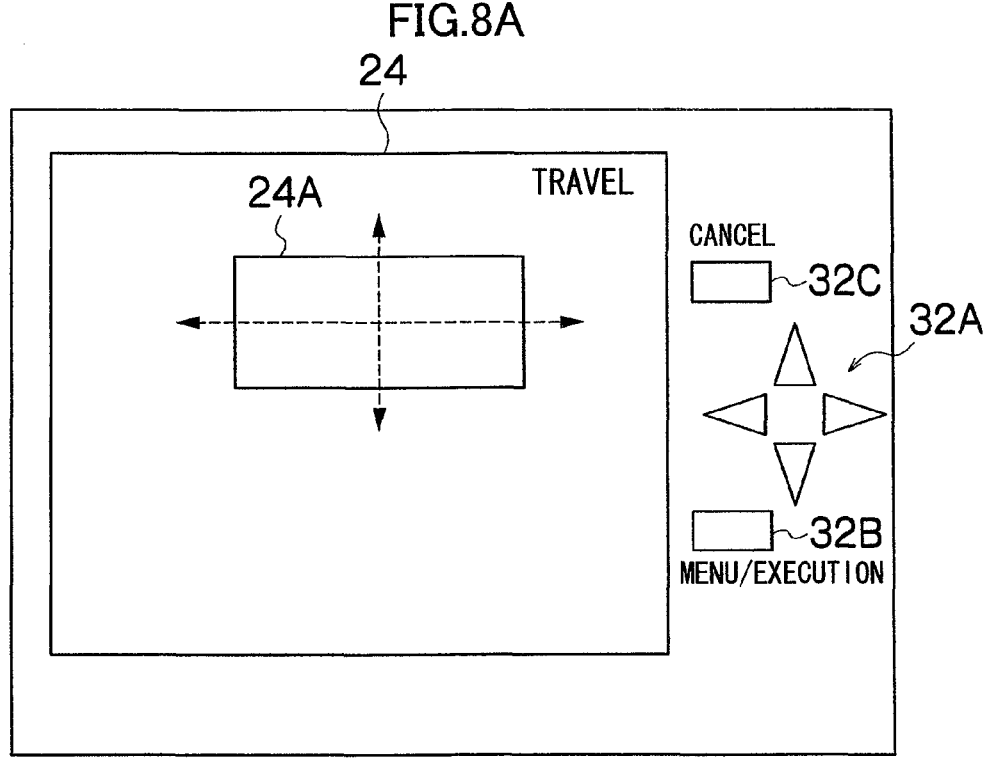
FIGS. 8A and 8B are explanatory views of travel/reduction of a focus adjustment area.
Figure 8B:
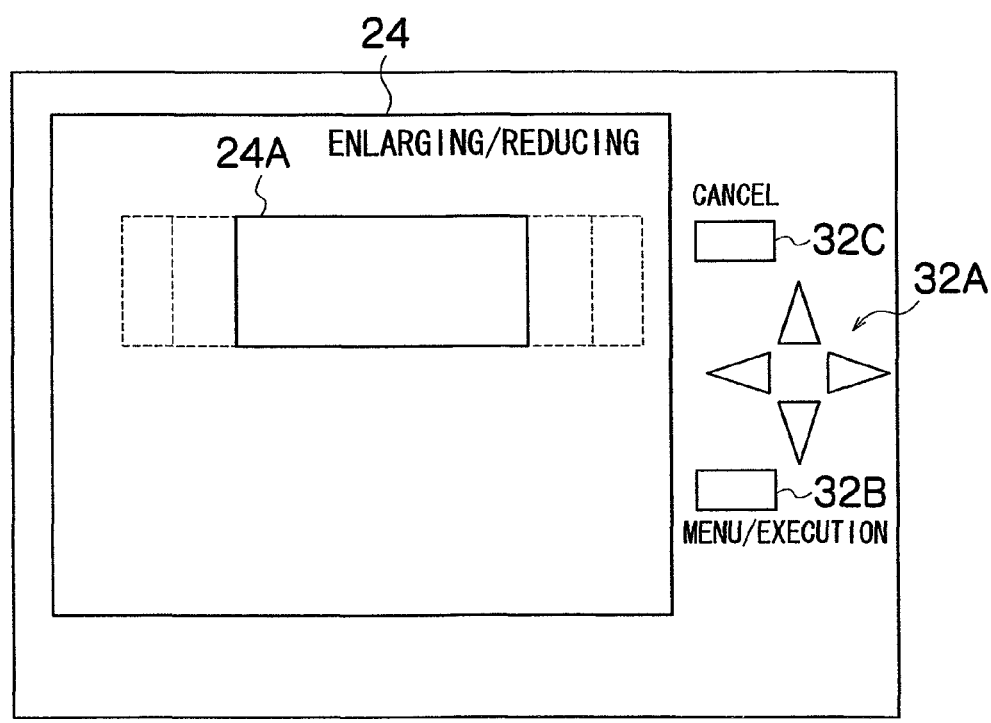

FIGS. 8A and 8B are back views of the digital camera 10. On the back of the digital camera 10, the display unit 24, a cross key 32A as the operation unit 32, a "MENU/execution" key 32B, and a "cancel" key 32C are provided.

When a focus adjustment area is changed, the "MENU/execution" key 32B and the cross key 32A are operated and a change menu of the focus adjustment area is selected, and one of the travel/enlarge/reduce mode is selected.

As shown in FIG. 8A, when the travel mode of a focus adjustment area is selected, and the up/down/left/right key of the cross key 32A is operated, a frame 24A indicating the focus adjustment area is moved up, down, left, and right on the screen of the display unit 24. After moving the frame 24A to a desired position, press the "MENU/execution" key 32B to determine the focus adjustment area and enter the shooting mode.

As shown in FIG. 8B, the enlarge/reduce mode of the focus adjustment area is selected, and the right or left key of the cross key 32A is pressed to enlarge or reduce the frame 24A horizontally. Similarly, when the up key or the down key of the cross key 32A is pressed, the frame 24A is enlarged or reduced vertically. Thus, after enlarging or reducing the frame 24A into a desired size, the "MENU/execution" key 32B is pressed to determine the focus adjustment area and enter the shooting mode.

Figure 9:
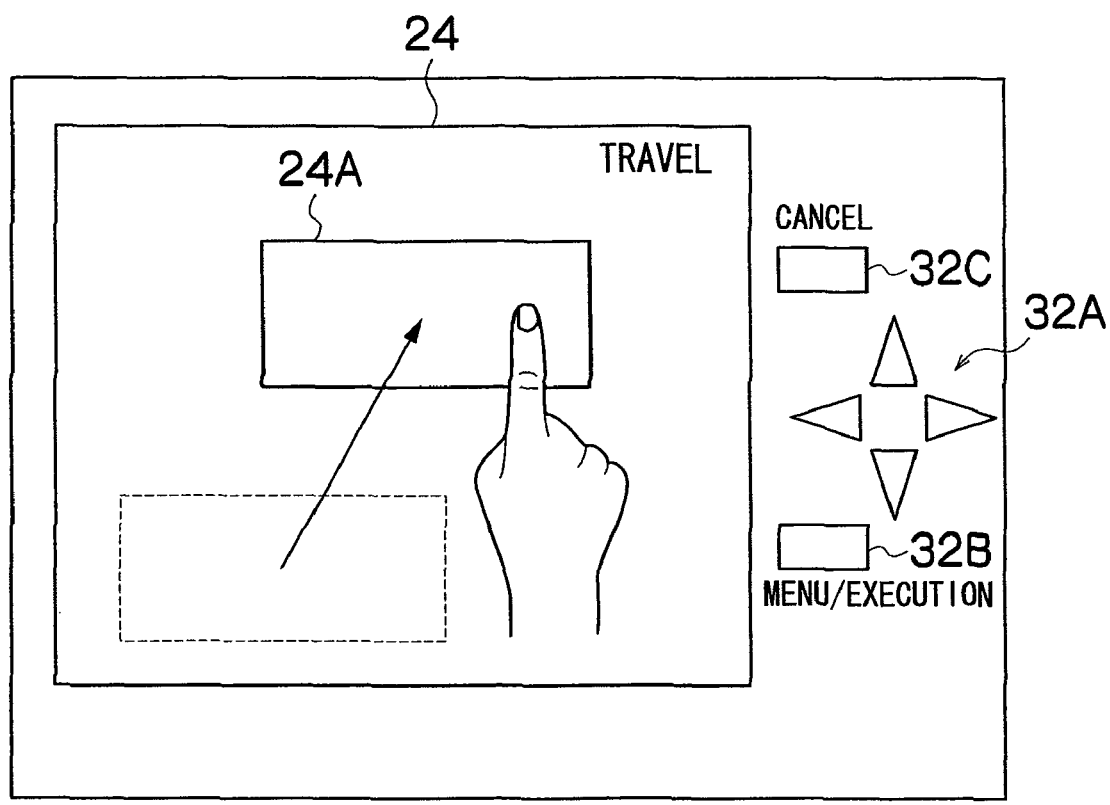
FIG. 9 is an explanatory view showing other embodiments of travel of a focus adjustment area.

As shown in FIG. 9, the display unit 24 can be used as a display unit with a touch panel so that a touched portion can be the central portion on which the focus adjustment area is moved. Furthermore, it is desired in signal processing to move, enlarge, and reduce the frame 24A in a divided area unit as shown in FIG. 7.

Back in FIG. 6, when a focus adjustment area is set, the high-frequency component of an image signal of each divided area in the focus adjustment area is extracted by the HPF set in step S16 shown in FIG. 2, the HPF output of each divided area is added up, and each add-up value is obtained (steps S183 and S184). Then, the focal information is calculated by calculating the add-up value in each divided area in the focus adjustment area (step S185).

Figure 10:
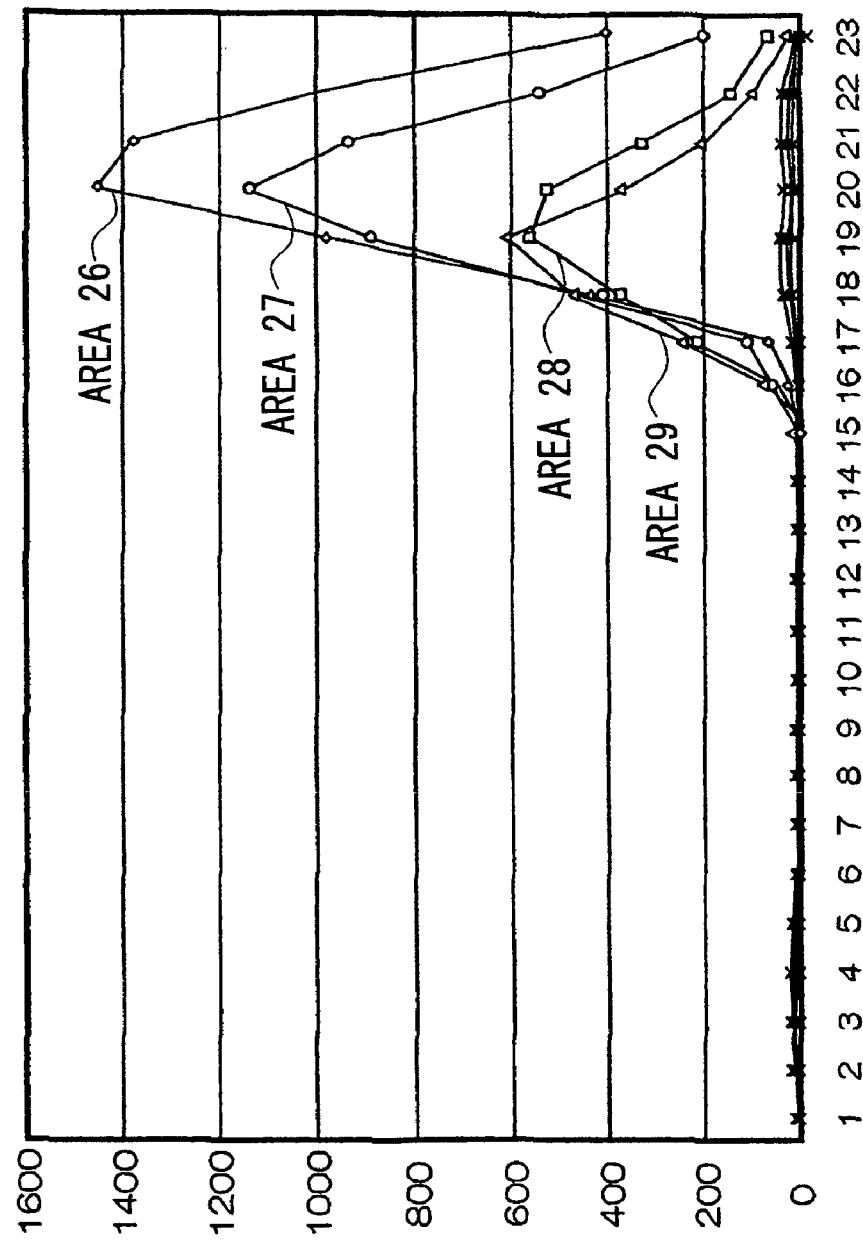
FIG. 10 is a graph showing the add-up value of HPF output by divided area of a focus adjustment area calculated for each position of a focus lens.
Figure 11:
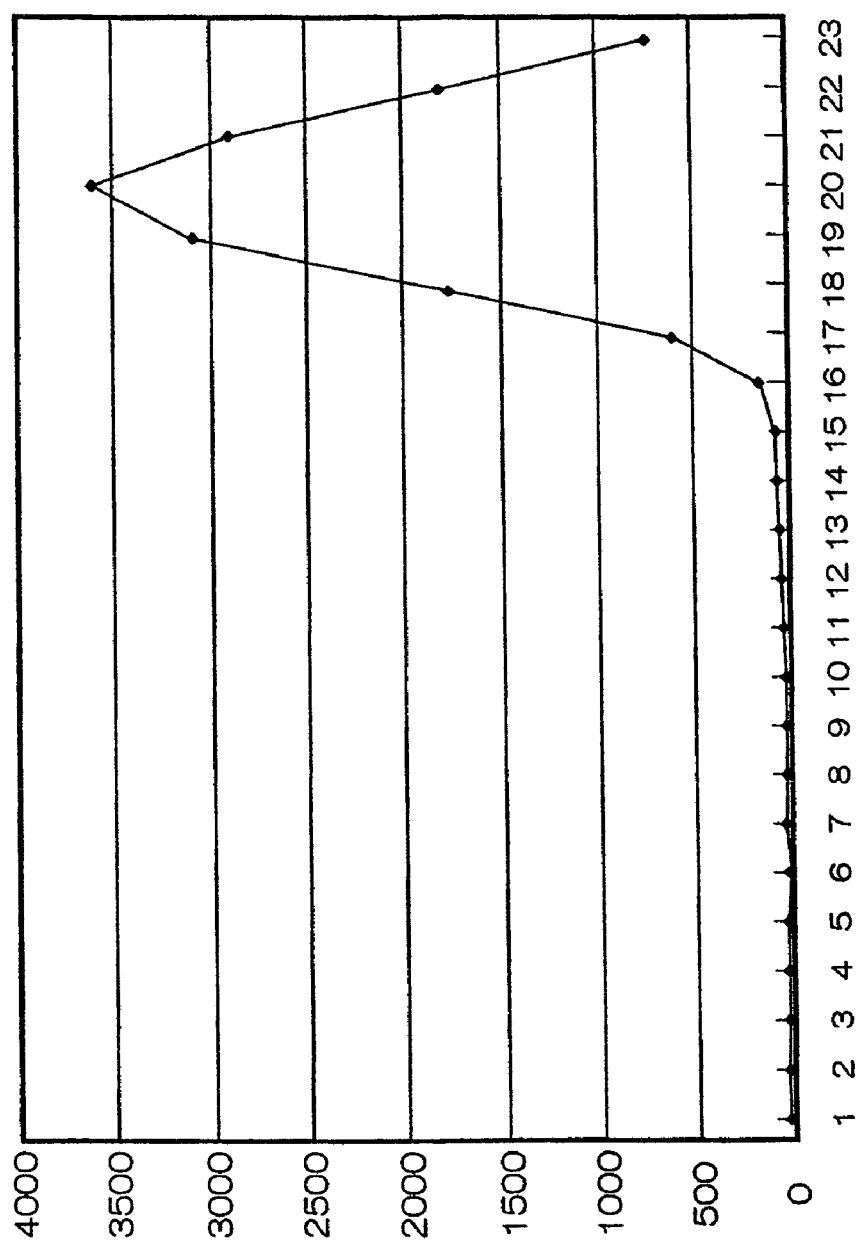
FIG. 11 is a graph showing the focal information about an add-up value of the HPF output by divided area shown in FIG. 10.

FIG. 10 is a graph showing the add-up value of the HPF output in the divided areas 26~29 (refer to FIG. 7) calculated for each position of the focus lens. FIG. 11 is a graph of the focal information obtained by an add-up value. As shown in FIG. 11, the value of the focal information changes depending on the position of a focus lens, but the lens position in which a peak of the focal information is obtained indicates the highest contrast of the subject, and normally a focal state.

Back in FIG. 2, when the focal information is calculated, the focal information is displayed on the display unit 24 (step S20). Then, it is determined whether or not the focus ring 14 has been changed to make an MF adjustment (step S22). If it has been changed, control is returned to step S18, the focal information in the position of the focus lens moved with the change of the focus ring 14 is detected again, and the detected focal information is displayed.

Figure 12:
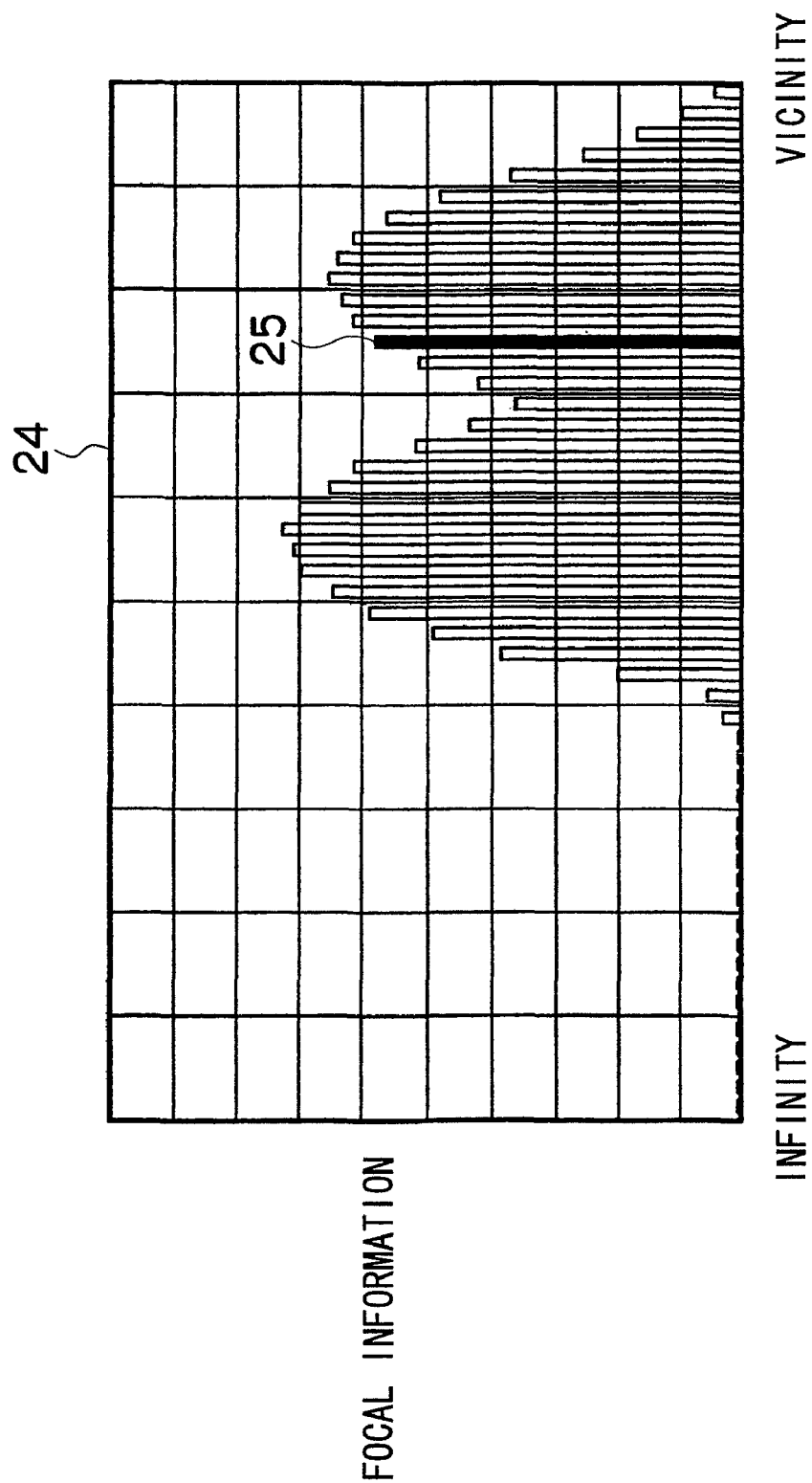
FIG. 12 is a graph showing an example of focal information corresponding to the lens position displayed on a display unit of a digital camera.

FIG. 12 is a graph showing the relationship between each lens position and focal information displayed on the display unit 24 when the focus lens travels from the vicinity to the infinity, that is, the lens travel range.

As shown in the graph, focal information 25 at the current lens position is displayed as identified from the focal information in another lens position by changing the color or brightness. The graph is overlaid on the through image of the subject displayed on the display unit 24. The present invention is not limited to this application, but the screen of the display unit 24 can be divided into two and a through image and a graph can be separately displayed or the graph can be displayed on another display unit.

In the example shown in FIG. 12, there are two peaks in the focal information. For example, when an MF adjustment is made for a scene in which the principal subject such as a person has a high-contrast background, a graph as shown in FIG. 12 is displayed. Also when a person behind a metal is to be taken, there are two peaks of the lens position focusing on the metal and the lens position focusing on the person.

The user who takes an image determines which subject is to come into focus using a through image displayed on the display unit 24 when there are a plurality of peaks of a focal information, and an MF adjustment is made by operating the focus ring 14 such that the focal information 25 about the current lens position can match the peak of the desired focal information while checking the graph of the focal information. When there are different pieces of focal information about the same lens position, the latest focal information is defined as updated information.

In step S22 shown in FIG. 2, when the focus ring 14 is not changed, control is passed to step S 24, and it is determined whether or not the focus adjustment area has been changed. If the focus adjustment area has been changed, all focal information obtained in the past is deleted, the display of the focal information is reset (step S26), and the focal information about the newly set focus adjustment area is calculated in step S18.

In step S24, when the focus adjustment area is not changed, control is passed to step S 28, and it is determined whether or not capturing an image has been designated by the operation of a shutter button in step S28. If the capturing operation is designated, the AE is performed for capturing, various signal processing operations are performed on the image signal obtained by the capturing operation, and the image is recorded on a recording medium (step S30).

If there is no designation for a capturing operation, it is determined whether or not the AE for focusing has been changed after confirming the AE in step S14. If the AE for focusing has not been changed, then it is determined that the captured scene has not been changed, and control is returned to step S18. If the AE for focusing has been changed, it is assumed that a captured scene has been changed, all focal information calculated in the past is deleted, the display of the focal information is reset (step S34), and control is returned to step S12.

Described below is another embodiment of the focusing assisting method when the MF adjustment is made according to the present invention.

Figure 13:
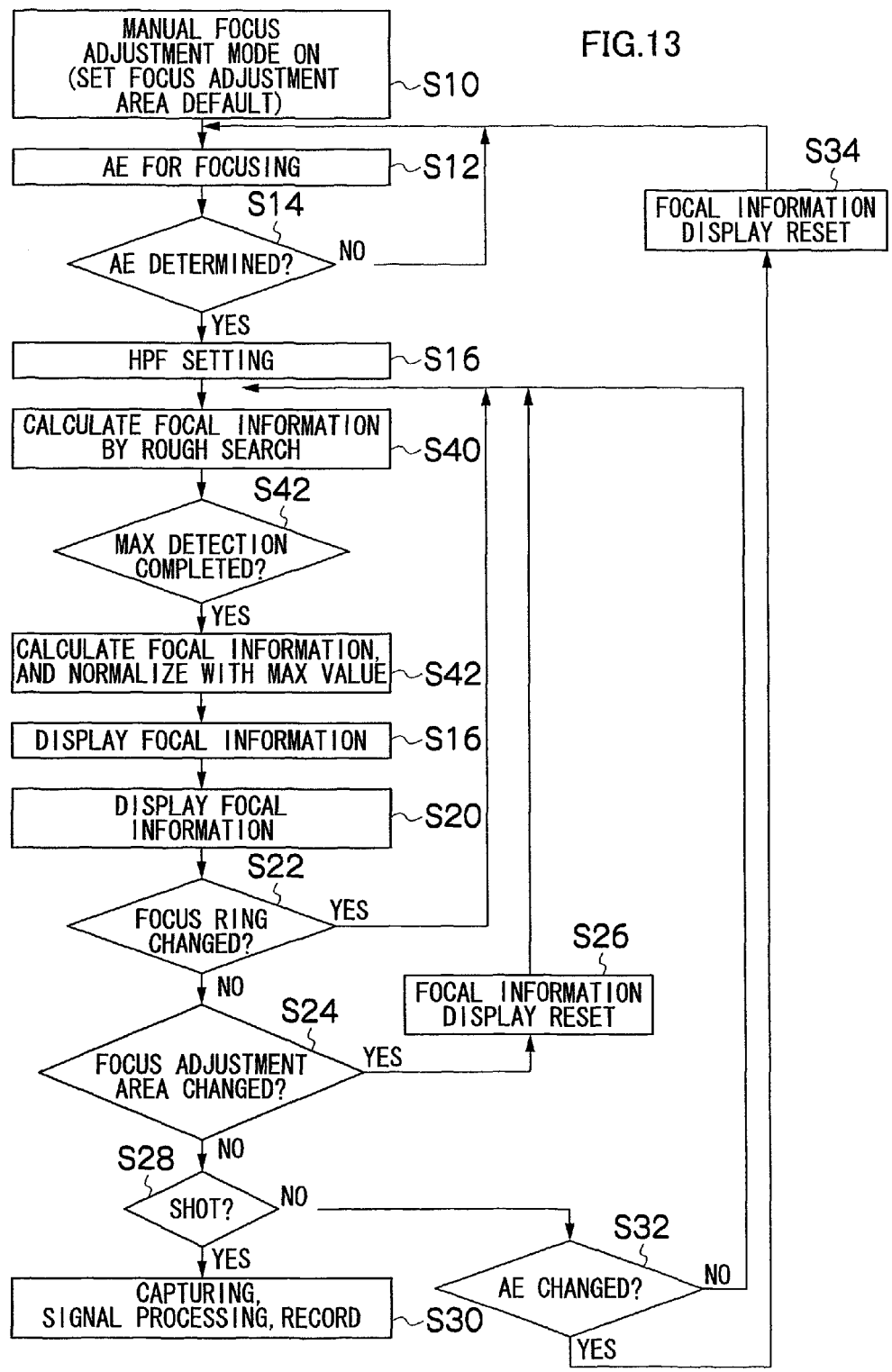
FIG. 13 is an entire flowchart including other embodiments of the contents of the process when an MF adjustment according to the present invention is performed.

FIG. 13 is the entire flowchart including the contents of the process according to another embodiment when an MF adjustment is made according to the present invention. The common processes between FIGS. 13 and 2 are assigned the same step numbers, and the detailed explanation is omitted here.

The embodiment shown in FIG. 13 is different from the embodiment shown in FIG. 2 in that an AF adjustment is made by a rough search of a focus lens before the MF adjustment.

That is, in step S40, a rough search for obtaining the focal information is performed. In this rough search, the focus lens automatically travels from the vicinity to the infinity, that is, the lens travel range using a stepping motor, etc. Each time the focus lens travels by a predetermined amount, the focal information is calculated. Thus, the maximum value of the focal information calculated by the rough search is detected (step S42).

The focus adjustment area in the rough search is, for example, a predetermined area at the center of the screen set by a default. During the rough search, the through image immediately before the rough search is stored so that the through image displayed on the display unit 24 cannot be changed.

Figure 14:
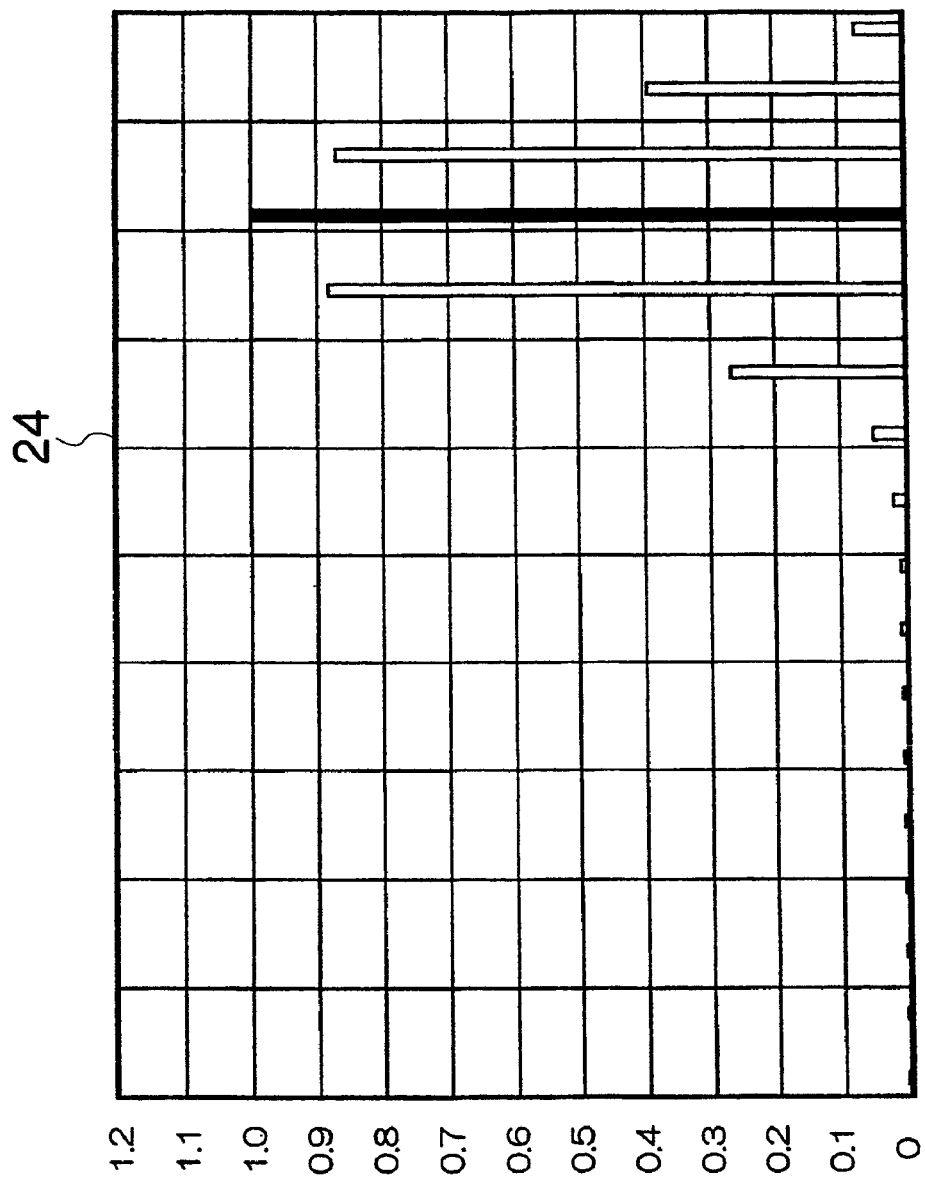
FIG. 14 is a graph showing an embodiment of each focal information normalized according to focal information obtained by rough scanning.

When the maximum value of the focal information about the current captured scene is detected in the rough search, the value of the focal information about each lens position obtained by a rough search is divided by the maximum value in FIG. 14, the result is normalized, the focus lens is moved to the lens position where the focal information can be the maximum value, and the lens is set in the standby state.

FIG. 14 is a graph showing an example of the focal information depending on each lens position displayed on the display unit 24 after a rough search and before an MF adjustment. When a plurality of peaks of the focal information are detected in a rough search, the focus lens travels to the nearest peak, and enter the standby state. Normally, a principal subject is positioned in the vicinity.

Afterwards, it is determined whether or not the focus ring 14 has been changed for the MF adjustment (step S22). When a change is made, control is returned to step S44, the focal information in the focus lens position after the travel of the focus ring 14 is detected, and the detected focal information is normalized and displayed.

That is, since the focal information is not calculated in the lens position in the rough search, an MF adjustment is performed by operating the focus ring 14 when more correct focus is obtained.

Thus, the focal information about the lens position not calculated in the rough search is calculated, and the focal information is added to the graph. When there are different pieces of focal information about the same lens position, the information is updated into the latest focal information. When the focal information indicating a value larger than the maximum value of the focal information calculated during the rough search is obtained during the MF adjustment, the normalized value of the focal information is larger than 1.

Thus, in the focal information obtained in the rough search, each piece of focal information is normalized by the maximum value. Therefore, the maximum value on the graph of the focal information displayed on the display unit 24 can be substantially uniform, thereby improving the operability during the MF adjustment.

Additionally, since the focal information obtained during the rough search before the MF adjustment is displayed, it is a useful mark in operating the focus ring, and the MF adjustment can be immediately performed. Furthermore, the focus lens can travel to the lens position in which the focal information indicates the maximum value during the rough search and the lens enters the standby state, thereby minimizing the amount of adjustment during the MF adjustment.

Figure 15:
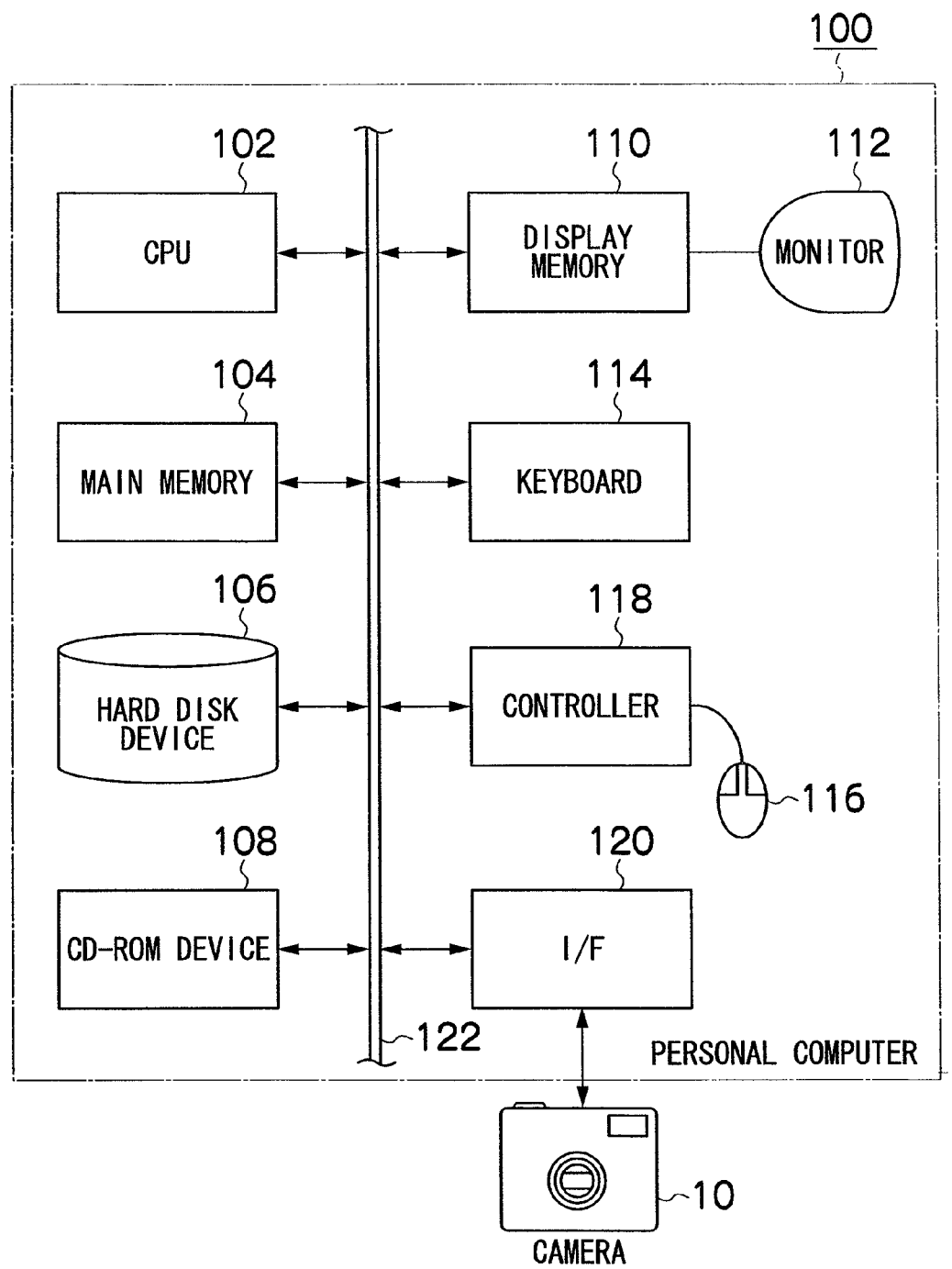
FIG. 15 is a block diagram showing an example of the configuration of hardware of a personal computer with a focus assisting facility when an MF adjustment is made according to the present invention.

FIG. 15 is a block diagram showing an example of the hardware configuration of the personal computer with a focus assisting facility during the MF adjustment according to the present invention.

As shown in FIG. 15, a personal computer 100 is configured by a central processing unit (CPU) 102 for controlling the operation of each component, main memory 104 storing the control program of a device which can be the work area during the execution of a program, an operating system (OS) of the personal computer 100, a device driver of a peripheral equipment corresponding to the personal computer 100, an application software including a focus assisting program according to the present invention, a hard disk device 106 storing an image of a user, etc., a CD-ROM device 108, display memory 110 temporarily storing display data, image data from the display memory 110, a monitor device 112 such as a CRT monitor, a liquid crystal monitor, etc. for displaying an image, a character, etc. through the image data, character data, etc. from the display memory 110, a keyboard 114, a mouse 116 as an input device, a mouse controller 118 for detecting the status of the mouse 116 and outputting a signal such as the position of the mouse pointer on the monitor device 112, the status of the mouse 116, etc. to the CPU 102, an interface 120 such as a USB (universal serial bus) capable of inputting image data, etc. as connected to the digital camera 10 and inputs image data, etc., and a bus 122 for connection to each component.

Since the personal computer 100 with the above-mentioned configuration is well-known except the focus assisting program stored in the hard disk device 106 according to the present invention, the detailed explanation of each component is omitted here. The focus assisting program can be installed in the personal computer 100 by setting the CD-ROM recording the program in the CD-ROM device 108.

The focus assisting during the MF adjustment of the digital camera 10 connected through the interface 120 is explained below.

First, the digital camera 10 captures an image for focusing during the MF adjustment mode, the image signal obtained by the capturing operation is output to the personal computer 100, the information about the focus lens position (the rotation position of the focus ring if the rotation position of the focus ring corresponds to the position of the focus lens) is output to the personal computer 100.

The personal computer 100 performs a process except the process specific (steps S12, S14, S16, S30 shown in FIG. 2) to the digital camera in the process flow including the focus assistance shown in FIG. 2 when the focus assisting process during the MF adjustment mode of the digital camera 10 is performed.

That is, the personal computer 100 calculates the focal information explained in step S18 shown in FIG. 2 based on the image signal of the focusing image input through the digital camera 10, and the focal information is graphed on the monitor device 112 depending on the lens position of the focus lens (refer to FIG. 12).

Thus, a user who takes an image operates a focus ring while checking the graph of the focal information displayed on the monitor device 112 of the personal computer 100, and can move the focus lens to the position of the peak as the focal information.

Since the monitor device 112 of the personal computer 100 is larger than the display unit 24 of the digital camera 10, a through image and a graph image can be arranged and displayed on the screen.

Furthermore, in the present embodiment, the focal information about each lens position is displayed by a bar graph, but the present invention is not limited to this application, but it can be displayed by other graph such as line graph. That is, the history of the focal information for each lens position of the focal information can be displayed, and the focal information about the current lens position can be displayed as identified from the focal information of other.

The invention claimed is:

1. A focus adjustment apparatus with a focus assistant facility, comprising:
    a search device configured to automatically move a lens for forming an image of a subject on an image pickup device in a lens travel range from vicinity to infinity before a manual focus adjustment is started;
    a focal information calculating device configured to calculate focal information depending on a contrast of the subject based on an image signal output from the image pickup device each time the search device automatically moves the lens by a predetermined amount;
    an autofocus adjustment device configured to perform an autofocus adjustment to obtain a maximum value of each piece of focal information calculated by the focal information calculating device when the search device moves the lens, and to move the lens to a lens position in which the maximum value is obtained;
    a focal information display device configured to display a graph illustrating a relationship between each lens position and focal information about each lens position in the lens travel range, based on the focal information about each lens position calculated by the focal information calculating device while the autofocus adjustment is performed before the manual focus adjustment is started; and
    an operation device configured to perform the manual focus adjustment to move the lens according to manual operation after the autofocus adjustment device moves the lens to the lens position in which the maximum value is obtained, wherein:
    the focal information calculating device calculates focal information based on an image signal output from the image pickup device each time the lens moves according to the manual operation by the operation device, and
    each time the lens moves to a moved position according the manual operation by the operation device while the manual focus adjustment is performed, the focal information display device adds focal information about the moved position obtained when the manual focus adjustment is performed to the graph illustrating the relationship between each lens position and the focal information obtained when the search device automatically moves the lens.

2. The focus adjustment apparatus with a focus assisting facility according to claim 1, wherein
    the focal information display device graphs focal information about each lens position from a starting position of the manual focus adjustment to a current lens position, based on the focal information about each lens position calculated by the focal information calculating device, and
    the focal information display device displays the focal information about the current lens position so that the current lens position can be identified from the focal information about another position on the graph.

3. The focus adjustment apparatus with a focus assisting facility according to claim 1, further comprising
    an normalization device configured to obtain a maximum value of each piece of focal information calculated by the focal information calculating device when the search device moves a lens, and normalize each piece of focal information calculated by the focal information calculating device based on the maximum value,
    wherein the focal information display device graphs the focal information normalized by the normalization device.

4. A non-transitory computer readable recording medium storing a focus assisting program for a computer, connected with an imaging device having an operation device configured to move a lens for forming an image of a subject on an image pickup device according to manual operation, to which an image signal output from the imaging device is input, wherein when a processor included in the computer reads the program, the processor is configured to execute:

automatically moving the lens in a lens travel range from vicinity to infinity before a manual focus adjustment is started;

calculating focal information depending on a contrast of the subject based on an image signal output from the image pickup device each time the lens automatically moves by a predetermined amount;

performing an autofocus adjustment to obtain a maximum value of each piece of focal information calculated when the lens automatically moves, and to move the lens to a lens position in which the maximum value is obtained;

displaying a graph illustrating a relationship between each lens position and focal information about each lens position in the lens travel range, based on the focal information about each lens position calculated while the autofocus adjustment is performed before the manual focus adjustment is started;

performing the manual focus adjustment to move the lens according to the manual operation after the lens is moved to the lens position in which the maximum value is obtained;

calculating focal information based on an image signal output from the image pickup device each time the lens moves according to the manual operation by the operation device; and each time the lens moves to a moved position according the manual operation by the operation device while the manual focus adjustment is performed, adding a display of focal information about the moved position obtained when the manual focus adjustment is performed to the graph illustrating the relationship between each lens position and the focal information obtained in the step of automatically moving the lens.

5. The non-transitory computer readable recording medium according to claim 4, wherein the processor is configured to execute:

graphing focal information about each lens position from a starting position of the manual focus adjustment to a current lens position, based on the focal information about each lens position, and displaying the focal information about the current lens position so that the current lens position can be identified from the focal information about another position on the graph.

6. The focus adjustment apparatus with a focus assisting facility according to claim 1, wherein, when there are different pieces of focal information about a same lens position, the focal information display device updates the focal information about the same lens position into a latest focal information.

7. The focus adjustment apparatus with a focus assisting facility according to claim 1, wherein the maximum value is a plurality of maximum values detected as a plurality of peaks, and wherein when the plurality of peaks of the focal information are detected, the autofocus adjustment device moves the lens to a nearest peak from among the plurality of peaks.

8. The non-transitory computer readable recording medium according to claim 4, wherein the processor is configured to execute:

when there are different pieces of focal information about a same lens position, updating the focal information about the same lens position into a latest focal information.

9. The non-transitory computer readable recording medium according to claim 4, wherein the maximum value is a plurality of maximum values detected as a plurality of peaks, wherein the processor is configured to execute:

when the plurality of peaks of the focal information are detected, moving the lens to a nearest peak from among the plurality of peaks.

* * * * *